(12) United States Patent
Anderson et al.

(10) Patent No.: US 12,392,548 B2
(45) Date of Patent: Aug. 19, 2025

(54) SYSTEM AND METHOD FOR TRACKING REFRIGERATOR INVENTORY

(71) Applicant: Springhouse Technologies Inc., McLean, VA (US)

(72) Inventors: John Anderson, Brooklyn, NY (US); Tyler Sanborn, Queens, NY (US); Boris Kontorovich, Brooklyn, NY (US); Charles Parks, Laramie, WY (US); Jennifer O'Neil, Boulder, CO (US); Bryce Copenhaver, Brooklyn, NY (US); Robert Marsh, Ponte Vedra Beach, FL (US); Travis Ruddy, Dayton, OH (US)

(73) Assignee: Springhouse Technologies Inc., McLean, VA (US)

( * ) Notice: Subject to any disclaimer, the term of this patent is extended or adjusted under 35 U.S.C. 154(b) by 152 days.

(21) Appl. No.: 18/477,942

(22) Filed: Sep. 29, 2023

(65) Prior Publication Data
US 2025/0109904 A1    Apr. 3, 2025

(51) Int. Cl.
| | |
|---|---|
| *F25D 29/00* | (2006.01) |
| *G06Q 10/087* | (2023.01) |
| *G06T 7/292* | (2017.01) |
| *G06V 10/764* | (2022.01) |
| *G06V 10/80* | (2022.01) |
| *G06V 20/68* | (2022.01) |
| *H04N 7/18* | (2006.01) |
| *H04N 23/90* | (2023.01) |

(52) U.S. Cl.
CPC ......... *F25D 29/005* (2013.01); *G06Q 10/087* (2013.01); *G06T 7/292* (2017.01); *G06V 10/764* (2022.01); *G06V 10/809* (2022.01); *G06V 20/68* (2022.01); *H04N 7/181* (2013.01); *H04N 7/188* (2013.01); *H04N 23/90* (2023.01); *F25D 2500/06* (2013.01); *F25D 2700/06* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 10,724,792 B2* | 7/2020 | Oh | ......................... G06V 20/20 |
| 11,692,769 B2 | 7/2023 | Morris et al. | |
| 2008/0181453 A1* | 7/2008 | Xu | ......................... G06T 7/194 |
| | | | 382/103 |

(Continued)

FOREIGN PATENT DOCUMENTS

| | | | | |
|---|---|---|---|---|
| DE | 102020202933 A1 | 9/2021 | | |
| EP | 3819844 A1 * | 5/2021 | ........... | G06Q 10/087 |
| WO | WO-2010127418 A1 * | 11/2010 | ........... | G11B 27/034 |

OTHER PUBLICATIONS

International Search Report filed in PCT/US2024/048768 mailed Nov. 26, 2024.

*Primary Examiner* — Gelek W Topgyal
(74) *Attorney, Agent, or Firm* — Rankin, Hill & Clark LLP

(57) ABSTRACT

A refrigerator includes a plurality of storage compartments within a refrigerated enclosure, a plurality of cameras mounted a main body or a door, and at least one computing device. The at least one computing device is configured to assign a direction to determine if an item is moving into, out of or internally within the refrigerated enclosure.

20 Claims, 5 Drawing Sheets

(56) References Cited

U.S. PATENT DOCUMENTS

| | | | |
|---|---|---|---|
| 2012/0169882 A1* | 7/2012 | Millar | G08B 13/19608 |
| | | | 348/E7.086 |
| 2015/0002660 A1 | 1/2015 | Lee et al. | |
| 2016/0088262 A1 | 3/2016 | Lee et al. | |
| 2018/0045457 A1 | 2/2018 | Ryu et al. | |
| 2019/0244465 A1* | 8/2019 | Saunders | G06Q 20/407 |
| 2020/0249660 A1* | 8/2020 | Rao | G05B 19/4183 |
| 2020/0380453 A1* | 12/2020 | Bernays | G06Q 20/203 |
| 2021/0209363 A1 | 7/2021 | Han | |
| 2022/0325946 A1 | 10/2022 | Schroeder et al. | |
| 2022/0414391 A1 | 12/2022 | Schroeder et al. | |
| 2023/0057240 A1 | 2/2023 | Schroeder | |
| 2023/0058922 A1 | 2/2023 | Schroeder | |
| 2023/0079388 A1* | 3/2023 | Fisher | G06T 7/0002 |
| | | | 382/103 |
| 2023/0194148 A1 | 6/2023 | Kempfle et al. | |
| 2023/0298351 A1 | 9/2023 | Lee et al. | |
| 2023/0306745 A1* | 9/2023 | Horii | G06V 20/44 |
| 2024/0378403 A1* | 11/2024 | Yli-Peltola | G06Q 20/18 |

* cited by examiner

SYSTEM AND METHOD FOR TRACKING REFRIGERATOR INVENTORY

BACKGROUND

Known refrigerators can include a camera for imaging and recording inventory disposed in an interior of the refrigerator. In known refrigerators including cameras for imaging and recording inventory, the cameras are located and designed to each have a field of view directed toward an interior of the refrigerator. When inventory items are placed in such refrigerators at locations that obscure view of other items from the camera, the camera has difficulty accurately recording the obscured inventory. Consequently, there is demand for a container with an inventory tracking system capable of accurately imaging, tracking, and recording inventory disposed therein.

SUMMARY

In view of the foregoing, a refrigerator includes a main body and a door pivotally mounted to and movable with respect to the main body between an open position and a closed position, the main body and the door defining a plurality of storage compartments within a refrigerated enclosure when the door is in the closed position. The refrigerator also includes a plurality of cameras mounted to at least one of the main body and the door. Each camera is positioned to have a field of view that includes an entrance opening leading to at least one storage compartment when the door is in the open position, the plurality of cameras being configured to capture images of an item passing through the entrance opening as the item is being loaded into or is being removed from the at least one storage compartment. The refrigerator also includes at least one computing device in operable connection with the plurality of cameras.

The at least one computing device includes a session controller module configured to start a session and to instruct each camera to begin capturing images based on a trigger signal received by the session controller. The at least one computing device also includes a synchronizer module configured to receive captured images from the plurality of cameras and to group the captured images into frame sets, with each frame set made up of respective captured images that were captured at a same time from different cameras among the plurality of cameras. The at least one computing device also includes an object identification module configured to determine whether each captured image in a respective frame set contains an object and to assign a class identification to the object.

The at least one computing device also includes an object tracking module configured to analyze sequential captured images from each camera and to assign track identifications to associate the object in one analyzed image to the object in other analyzed images per camera. The at least one computing device also includes an object merge module configured to compare the track identifications among the analyzed images from different cameras and to assign a merge identification to the object when the object is detected by the object identification module in captured images captured by multiple different cameras among the plurality of cameras. The at least one computing device also includes a subsequence delineation module configured to split the session into subsequences by corresponding merge identifications received from the object merge module. Each subsequence corresponds to an inventory change for the at least one storage compartment. The at least one computing device also includes a direction module configured to assign a direction to each subsequence based on the analyzed images to determine if the object is moving into, out of or internally within the refrigerated enclosure. The at least one computing device also includes an inventory update module configured to communicate with a database to update an inventory status of the at least one storage compartment based on each inventory change and the direction assigned thereto.

According to another aspect, a method for tracking inventory in a refrigerator includes starting a session based on receiving a trigger signal and capturing images using a plurality of cameras mounted to at least one of a main body and a door pivotally mounted to and movable with respect to the main body between an open position and a closed position. The main body and the door define a refrigerated enclosure when the door is in the closed position, each camera is positioned to have a field of view through an entrance opening plane of the refrigerated enclosure which is accessible when the door is in the open position, and the plurality of cameras is configured to capture images of an item passing through the entrance opening plane as the item is being loaded into or is being removed from the refrigerated enclosure.

The method also includes determining in a computing device in communication with the plurality of cameras whether each captured image contains an object. The method also includes analyzing in the computing device sequential captured images from each camera and assigning a track identification to associate the object in one analyzed image to the object in other analyzed images per camera. The method also includes comparing in the computing device track identifications among the analyzed images from different cameras and assigning a merge identification to the object when the object is detected in captured images captured by multiple different cameras among the plurality of cameras.

The method also includes splitting in the computing device the session into subsequences by corresponding merge identifications. Each subsequence corresponds to an inventory change within the refrigerated enclosure. The method also includes assigning in the computing device a direction to each subsequence based on the analyzed images to determine if the object is moving into, out of or internally within the refrigerated enclosure. The method also includes updating an inventory status in a database based on each subsequence and the direction assigned thereto.

According to another aspect, a non-transitory computer readable storage medium stores instructions that, when executed by a computer having a processor, cause the processor to perform the aforementioned method

DETAILED DESCRIPTION

Definitions

Figure 1:
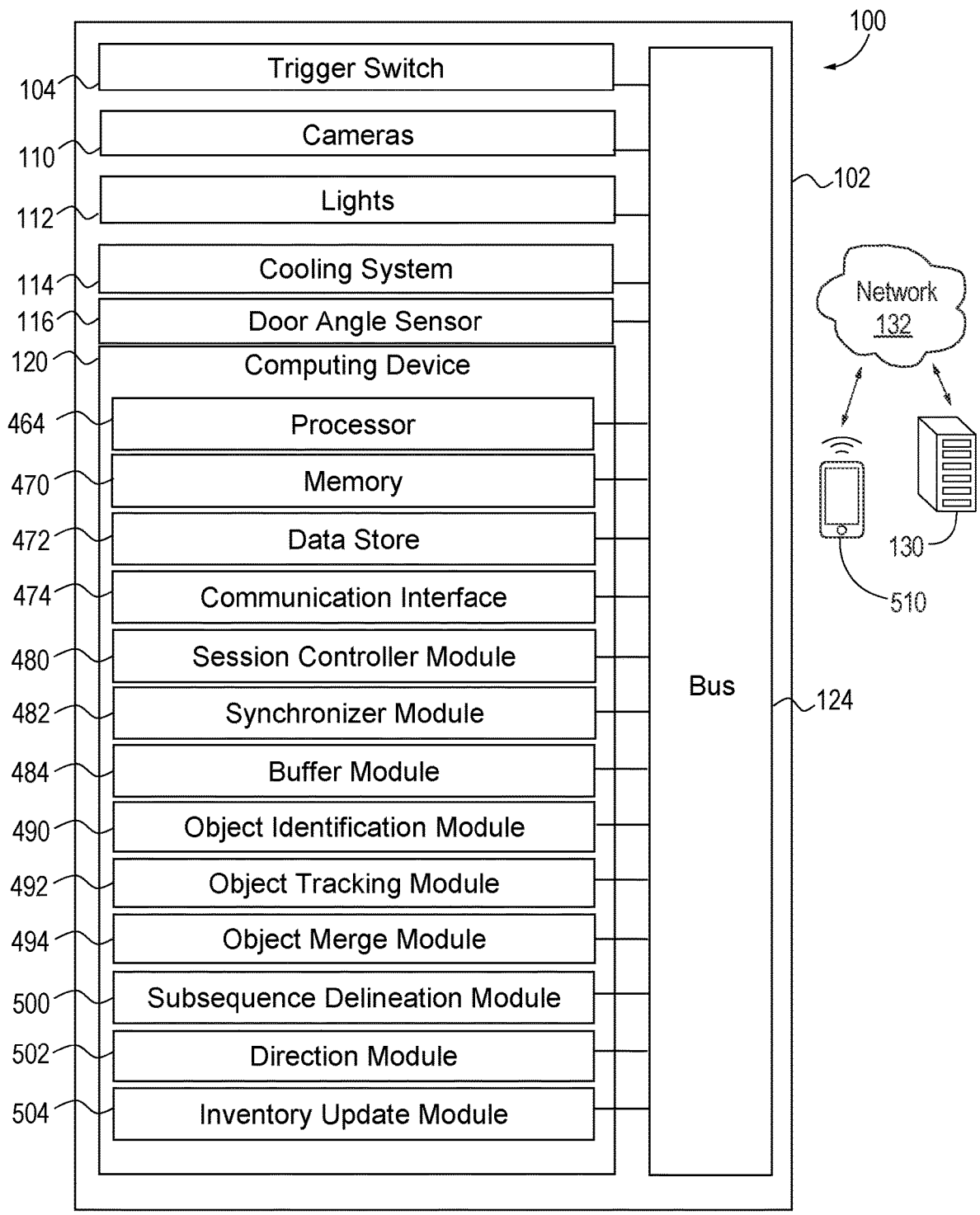
FIG. 1 is a block diagram representing an operating environment of a refrigerator including an inventory tracking system.

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

System Overview

Referring now to the drawings, which are for purposes of illustrating one or more exemplary embodiments and not for purposes of limiting the same, FIG. 1 is an exemplary component diagram of an operating environment 100 of a refrigerator 102 including a trigger switch 104, a plurality of cameras 110, lights 112, a cooling system 114, a door angle sensor 116 and a computing device 120.

Each of the trigger switch 104, the plurality of cameras 110, the lights 112, the cooling system 114, and the computing device 120 may be interconnected by a bus 124. The components of the operating environment 100, as well as the components of other systems, hardware architectures, and software architectures discussed herein, may be combined, omitted, or organized into different architectures for various embodiments.

The computing device 120 may be implemented as a part of the refrigerator 102 or another device, e.g., a remote server 130, connected via a network 132. The computing device 120 may be capable of providing wired or wireless computer communications utilizing various protocols to send and receive electronic signals internally to and from components of the operating environment 100. Additionally, the computing device 120 may be operably connected for internal computer communication via the bus 124 (e.g., a Controller Area Network (CAN) or a Local Interconnect Network (LIN) protocol bus) to facilitate data input and output between the computing device 120 and the components of the operating environment 100.

The cooling system 114 can be similar to those found in known refrigerators, and therefore will not be described in detail. The cooling system 114 can include temperature sensors for sensing temperatures within the refrigerator 102 and air blower fans supplying air cooled by cooling devices (not shown), which can include a compressor (not shown) compressing refrigerant, a condenser (not shown) condensing the compressed refrigerant, an expansion valve (not shown) decompressing the condensed refrigerant, and an evaporator (not shown) evaporating the decompressed refrigerant.

Figure 2:
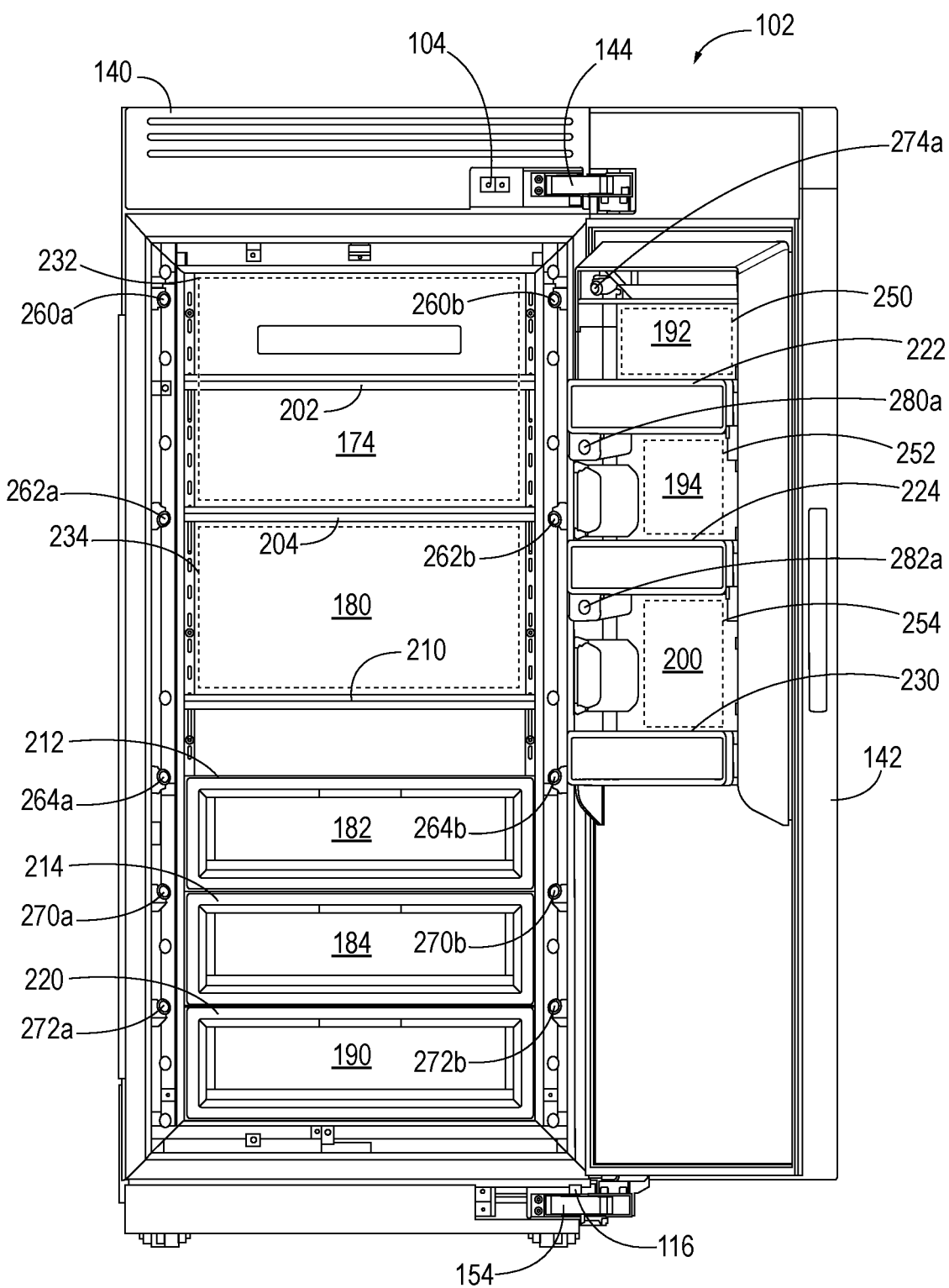
FIG. 2 is a front view of the refrigerator with a door shown in an open position.

As shown in FIG. 2, the refrigerator 102 includes a main body 140 and a door 142 pivotally mounted to and movable with respect to the main body 140 between an open position and a closed position similar to known refrigerators. The door 142 is connected to the main body 140 through an upper hinge 144 and a lower hinge 154. The main body 140 and the door 142 define a plurality of storage compartments within a refrigerated enclosure 172 when the door 142 is in the closed position. The plurality of storage compartments includes a first storage compartment 174, a second storage compartment 180, a third storage compartment 182, a fourth storage compartment 184, a fifth storage compartment 190, which are each located within the main body 140 in the illustrated embodiment. A sixth storage compartment 192, a seventh storage compartment 194, and an eighth storage compartment 200 are located on the door 142 in the illustrated embodiment. The number and location of the storage compartments 174, 180, 182, 184, 190, 192, 194 and 200 may differ from that shown in FIGS. 2 and 3.

Figure 3:
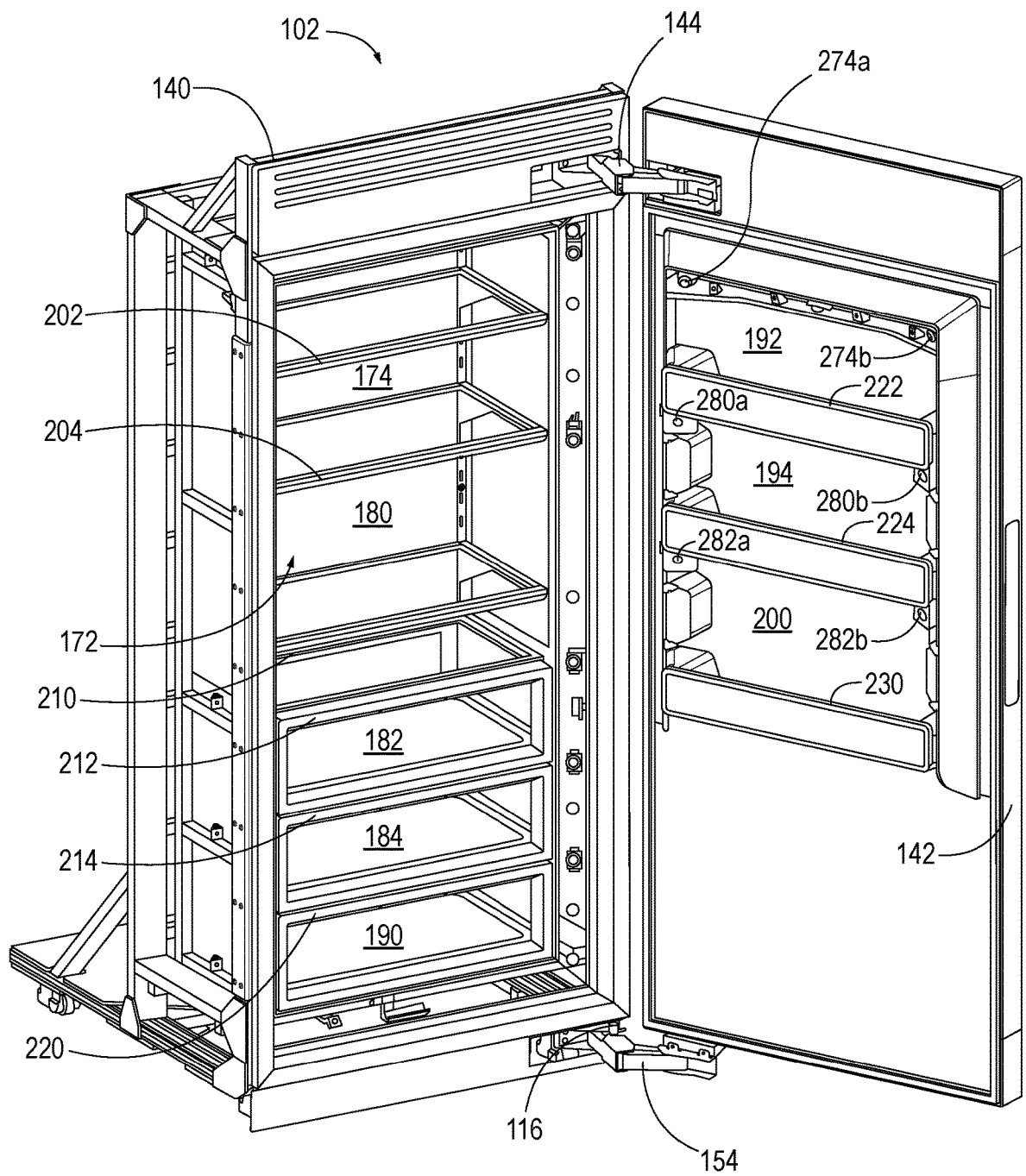
FIG. 3 is a perspective view of the refrigerator with the door shown in the open position.

As illustrated in FIGS. 2 and 3, a first shelf 202 and a second shelf 204 are disposed in the first storage compartment 174. A third shelf 210 is disposed in the second storage compartment 180. A first drawer 212 is disposed in the third storage compartment 182. A second drawer 214 is disposed in the fourth storage compartment 184. A third drawer 220 disposed in the fifth storage compartment 190. A first bin 222 is disposed in the sixth storage compartment 192. A second bin 224 is disposed in the seventh storage compartment 194. A third bin 230 is disposed in the eighth storage compartment 200.

Each storage compartment 174, 180, 182, 184, 190, 192, 194 and 200 defines a respective entrance opening through which items may be placed into and taken out of the corresponding storage compartment. More specifically and with reference to FIG. 2, the first storage compartment 174 defines a first entrance opening 232 leading onto the first shelf 202 and the second shelf 204, and the second storage compartment 180 defines a second entrance opening 234 leading onto the third shelf 210. The third storage compartment 182 defines a third entrance opening (not visible in FIGS. 2 and 3) leading into the first drawer 212, the fourth storage compartment 184 defines a fourth entrance opening (not visible in FIGS. 2 and 3) leading into the second drawer 214, and the fifth storage compartment 190 defines a fifth entrance opening (not visible in FIGS. 2 and 3) leading into the third drawer 220 when the respective drawers 212, 214, 220 are opened. The sixth storage compartment 192 defines a sixth entrance opening 250 leading into the first bin 222, the seventh storage compartment 194 defines a seventh entrance opening 252 leading into the second bin 224, and the eighth storage compartment 200 defines an eighth entrance opening 254 leading into the third bin 230.

The plurality of cameras 110 is mounted to the main body 140 and the door 142 for capturing images of objects moving into and out of the plurality of storage compartments 174, 180, 182, 184, 190, 192, 194 and 200. The plurality of cameras 110 includes a first set of cameras 260a, 260b mounted on the main body 140 associated with the first storage compartment 174, a second set of cameras 262a, 262b mounted on the main body 140 associated the second storage compartment 180, a third set of cameras 264a, 264b mounted on the main body 140 associated with the third storage compartment 182, a fourth set of cameras 270a, 270b mounted on the main body 140 associated with the fourth storage compartment 184, and a fifth set of cameras 272a, 272b mounted on the main body 140 associated with the fifth storage compartment 190. As more clearly seen in FIG. 3, the plurality of cameras 110 also includes a sixth set of cameras 274a, 274b mounted on the door 142 associated with the sixth storage compartment 192, a seventh set of cameras 280a, 280b mounted on the door 142 associated with the seventh storage compartment 194, and an eighth set of cameras 282a, 282b mounted on the door 142 associated with the eighth storage compartment 200.

As shown between FIGS. 2 and 3, the cameras with a suffix "a" are positioned at a left side of the corresponding storage compartment, and the cameras with a suffix "b" are positioned at a right side of the corresponding storage compartment. Instead of having a field of view towards the interior of the refrigerator 102, each camera among the plurality of cameras 110 has a field of view directed away from the interior of the refrigerator 102. The first set of cameras 260a, 260b are positioned in a top portion of the first storage compartment 174 above the first shelf 202 and the second shelf 204 with a field of view encompassing the first entrance opening 232. The second set of cameras 262a, 262b are positioned at a top portion of the second storage compartment 180 above the third shelf 210 with a field of view encompassing the second entrance opening 234. The third set of cameras 264a, 264b are positioned above the first drawer 212 with a field of view encompassing the third entrance opening (not visible in FIGS. 2 and 3) leading into the first drawer 212 when the first drawer 212 is opened. The fourth set of cameras 270a, 272b are positioned above the second drawer 214 with a field of view encompassing the fourth entrance opening (not visible in FIGS. 2 and 3) leading into the second drawer 214 when the second drawer 214 is opened. The fifth set of cameras 272a, 272b are positioned above the third drawer 220 with a field of view encompassing the fifth entrance opening (not visible in FIGS. 2 and 3) leading into the third drawer 220 when the third drawer 220 is opened.

The sixth set of cameras 274a, 274b are mounted to the door 142 above the first bin 222 with a field of view encompassing the sixth entrance opening 250. The seventh set of cameras 280a, 280b are mounted to the door 142 above the second bin 224 with a field of view encompassing the seventh entrance opening 252. The eighth set of cameras 282a, 282b are mounted to the door 142 above the third bin 230 with a field of view encompassing the eighth entrance opening 254. In this manner, each camera in the plurality of cameras 110 is positioned to have a field of view that includes a respective entrance opening leading to the corresponding storage compartment when the door 142 is in the open position. With this construction, the plurality of cameras 110 is configured to capture images of an item passing through any of the entrance openings as the item is being loaded into or is being removed from the corresponding storage compartment.

The computing device 120 controls the lights 112 (only depicted schematically in FIG. 1, but similar to lights in known refrigerators) during a session for optimized processing by the computer vision models described below. The computing device 120 also controls configuration aspects of each camera in the plurality of cameras 110 including a frame rate and an exposure for optimized processing by the computer vision models.

With reference to FIGS. 1 and 2, the refrigerator 102 includes the trigger switch 104 mounted to the main body 140. The trigger switch 104 is operably connected with the computing device 120 and configured for detecting a position of the door 142 to indicate whether the door 142 is in the open position or the closed position. In this manner, the trigger switch 104 is configured to send a trigger signal to the computing device 120 based on whether the door 142 is in the open position or the closed position. More specifically, the trigger switch 104 is configured to send a start trigger signal to the computing device 120 when the door 142 moves from the closed position toward the open position, and the trigger switch 104 is configured to send a stop trigger signal to the computing device 120 when the door 142 moves from the open position to the closed position. The trigger switch 104 may include at least one of various types of position sensors such as mechanical switches, potentiometers, piezoelectric sensors, Hall effect sensors, and eddy-current sensors without departing from the scope of the present disclosure. Also, while the trigger switch 104 is shown disposed on the main body 140, the trigger switch 104 may additionally or alternatively be positioned on the door 142.

The door angle sensor 116 is configured to determine the angle of the door 142 with respect to the main body 140. The door angle sensor 116, for example, could include a rotary encoder having a shaft the rotates as the door 142 pivots with respect to the main body 140 to output and communicate with the computing device 120 to communicate the relative angular position of the door 142 with respect to the main body 140.

Referring back to FIG. 1, the computing device 120 includes a processor 464, a memory 470, a data store 472, and a communication interface 474, which are each operably connected for computer communication via the bus 124. The communication interface 474 provides software and hardware to facilitate data input and output between the components of the computing device 120 and other components, networks, and data sources, which will be described herein. The computing device 120 also includes a session controller module 480, a synchronizer module 482, a buffer module 484, an object identification module 490, an object tracking module 492, an object merge module 494, a subsequence delineation module 500, a direction module 502, and an inventory update module 504 for receiving image information from the plurality of cameras 110 and tracking inventory in the refrigerator 102.

The computing device 120 is in operable connection with the plurality of cameras 110. The session controller module 480 is configured to start a session and to instruct each camera in the plurality of cameras 110 to begin capturing images based on the start trigger signal received by the session controller module 480 from the trigger switch 104. The plurality of cameras 110 begin capturing images after the session controller module 480 receives the start trigger signal from the trigger switch 104, and the plurality of cameras 110 cease capturing images after the session controller module 480 receives the stop trigger signal from the trigger switch 104. The plurality of cameras 110 are each configured to compress captured images, to assign a session identification (ID), to assign a camera identification (ID) and to assign a frame identification (ID) for each captured image and send the compressed images along with their respective session ID, camera ID and frame ID to the synchronizer module 482, which can occur during or after a session, which is the time between opening and closing of the door 142. A session can be relatively long and may include the transferring of multiple items into and out of the refrigerator 102.

The synchronizer module 482 is configured to receive captured images and the session ID, camera ID and frame ID associated with each captured image from the plurality of cameras 110, and to group the captured images into frame sets based on the frame ID associated with each captured image. Each frame set is made up of respective captured images that were captured at the same time from different cameras among the plurality of cameras 110. In an embodiment, the synchronizer module 482 groups captured images from the plurality of cameras 110 based on the frame ID associated with each image. In this regard, the same frame ID among different captured images indicates the images were taken at the same time albeit from different cameras.

The synchronizer module 482 receives the session ID and the camera ID, in addition to the frame ID for each captured image received from each camera in the plurality of cameras 110. The session ID is associated with the session assigned by the session controller module 480, the camera ID is associated with a particular camera among the plurality of cameras 110 that captured the captured image, and the frame ID, as mentioned above, is associated with a time at which the captured image was captured.

The buffer module 484 is configured to store compressed captured images as an image buffer memory, and is configured to send the compressed captured images to a remote server, e.g., the remote server 130 (FIG. 1), for post processing after the session ends. With this construction, system resources of the computing device 120 may be directed to image capture during the session, and then directed to post processing when the session has ended, thereby reducing a capacity of the computing device 120 required for receiving image information from the plurality of cameras 110 and tracking inventory in the refrigerator 102.

The object identification module 490 is configured to determine whether each captured image in a respective frame set contains an object, to define a bounding box around each object located in the respective captured image and to assign a class identification to the object. Class identifications assigned by the object identification module 490 indicate an inventory type of the object. The inventory type can be maintained in the memory 470 and/or data store 472 of the computing device 120, or stored remotely and accessed via the network 132. The inventory type may indicate a category of ingredient, food product, meal, dish, or other object type maintained in the database.

The object identification module 490 includes a computer vision model that outputs a bounding box around the object and the class identification for the object for each captured image. In an embodiment, the computer vision model is YOLOv5, however the object identification module 490 may include additional or alternative computer vision models for determining object presence and class identification in the refrigerator 102 without departing from the scope of the present disclosure.

The computer vision model used in the object identification module 490 can also be configured to remove images from frame sets received from the synchronizer module 482 that do not contain an object and to output an updated group of images to the object tracking module 492. The updated group of images, which may include only captured images that contain an object, may include a lesser number of images as compared to the frame set received by object identification module 490 from the synchronizer module 482. The first captured image that contains an object in the updated group of images can indicate the start of a sequence, which indicates one hand motion in or out of the refrigerator. The last captured image that contains an object in the updated group of images can indicate the end of the sequence. Where the object identification module 490 identifies no object, for example the object identification module 490 identifies an empty hand without any object to be loaded into or removed from the refrigerator, the last captured image containing the object can indicate the end of the sequence. Each sequence, or detected motion in or out of the refrigerator 102, can contain multiple objects. For example, a person could insert two items, e.g., an apple and a cup of yogurt, into or out of the refrigerator in a single sequence. In such an instance, the object identification module 490 assigns a first class identification to the apple that appears as one object in the captured image and assigns a second class identification to the cup of yogurt that appears as another object in the captured image.

The object tracking module 492 is configured to analyze sequential captured images from each camera in the plurality of cameras 110 tracking objects among the sequential captured images per camera. In an embodiment, the object tracking module 492 compares a first n images captured in the updated group of images during a sequence to a last n images captured in the updated group of images during the sequence to track movement of objects during the sequence. Then number n of images in the illustrated embodiment is three, but the number could be higher or lower. Determination of the temporal sequence of captured images is based on the frame ID associated with each image. For example, captured images having a higher frame ID can be captured later in time as compared to those with a lower frame ID. Determination of the camera that captured a respective captured image is based on the camera ID associated with the respective captured image. In this regard, the object tracking module 492 associates an object with itself across sequential images per camera, thereby tracking movement of the object over time.

In an embodiment, the object tracking module 492 is also configured to assign track identifications to associate the object in one analyzed image to the object in other analyzed images per camera in the plurality of cameras 172. Track identifications assigned by the object tracking module 492 are unique to each camera in the plurality of cameras 172, and unique to each object captured by the plurality of cameras 172 in sequential captured images. With reference to the apple and cup of yogurt example discussed above, the object tracking module 492 is configured to assign a different track identification to the object that appears as the apple in the captured image than the track identification for the object that appears as the cup of yogurt in the captured image. Also, the track identification for the object that appears as the apple in the captured image from camera 260*a* of the first set of cameras 260*a*, 260*b* will be a different track identification for the object that appears as the apple in the captured image from camera 260*b*. In this manner, each track identification assigned by the object tracking module 492 identifies a single object across sequential captured images by a single camera in the plurality of cameras 172.

The object tracking module 492 can employ an observation-centric simple online and real-time tracking (OCSORT) algorithm for analyzing the sequential captured images from each camera in the plurality of cameras 110. With this construction, the object tracking module 492 receives the updated group of images with bounding boxes and class IDs from the object identification module 490 and the OCSORT algorithm can process the updated group of images, and then output a further updated group of images with the bounding boxes, class IDs and additionally include associated track IDs for each object located in each captured image in the further updated group of images.

The object merge module 494 is configured to compare track IDs among analyzed images from different cameras in the plurality of cameras 110, and to assign a merge ID to an object when the object is detected by the object identification module 490 in captured images captured by multiple different cameras in the plurality of cameras 110. With reference to the apple and cup of yogurt example discussed above, the object merge module 494 is configured to compare the different track identifications for the object that appears as the apple in the captured images from camera 260a of the first set of cameras 260a, 260b with the different track identification for the object that appears as the apple in the captured images from camera 260b and to assign the same merge ID for the object that appears as the apple in the captured images from both cameras 260, 260b. The object merge module 494 determines the merge ID based on each track ID of the same sequence.

Each merge ID assigned by the object merge module 494 is unique to a single object captured by the plurality of cameras 110 during a subsequence of a sequence. Where a sequence refers to one hand motion into or out of the refrigerator 102, a subsequence refers to the transfer of an individual item into or out of the refrigerator 102. As such, each merge ID assigned by the object merge module 494 associates an object with itself across images captured by multiple different cameras in the plurality of cameras 110 per sequence. The object merge module 494 is supported by an algorithm to analyze the object(s) in the bounding box(es) in each captured image in the further updated group of images and to assign the same merge ID to the same object detected in images captured from different cameras per sequence. With reference to the apple and cup of yogurt example discussed above, there will be a different merge ID associated with the apple as compared to with the cup of yogurt.

The subsequence delineation module 500 is configured to split a session into subsequences by corresponding merge IDs received from the object merge module 494. Each subsequence defined by the subsequence delineation module 500 corresponds to a single merge identification, which corresponds to an inventory change with respect to a single item among the plurality of storage compartments 172. As such, the subsequence delineation module 500 is configured to split the session in accordance with individual inventory changes among the plurality of compartments 172.

The direction module 502 is configured to assign a direction to each subsequence based on the analyzed images to determine if the object is moving into, out of or internally within the refrigerated enclosure. In an embodiment, the direction module 502 uses a transformer based classifier, e.g., a vision transformer such as CSWin Transformer, and compares the first n analyzed images to the last n analyzed images during a subsequence to determine the direction, where n can be three images. Because the analyzed images are those that contain the object, the first n analyzed images are indicate of the object entering a particular camera's field of view and the last n images are indicative to the object leaving the particular camera's field of view. For example, the direction module 502 is configured to locate the centroid of the bounding box around the object within the first n analyzed images and the last n analyzed images. The location of the centroid within each analyzed image and the change of location of the centroid from one analyzed image to another provides an indication of movement and the direction of movement of the object that is bound by the bounding box. Because the cameras 274a, 274b, 280a, 280b, 282a, 282b mounted to the door 142 can move with respect to the main body 140, knowing the door angle, which can be calculated using the door angle sensor 116, provides accurate dimensions for determining the movement of the centroid of the bounding box among the analyzed images. Moreover, because the location of the cameras 260a, 260b, 262a, 262b, 264a, 264b, 272a, 272b mounted to the main body 140 are known with respect to their location relative to the plurality of storage compartments 174, 180, 182, 184, 190 in the main body and can be determined based on the door angle with respect to the plurality of storage compartments 192, 194 and 200, the movement of the centroid of the bounding boxes over the analyzed images can be used to detect the direction of the object within the bounding box over the 2n images being analyzed.

In another embodiment, the direction module 502 can determine the direction of the object with reference to a corresponding entrance opening 232, 234, 250, 252, 254 in a three-dimensional grid space, over time between sequential images, and across multiple cameras in the plurality of cameras 110. In an embodiment, the direction module 502 compares the first captured image to the last captured image by the plurality of cameras 110 during a subsequence to determine the direction.

The direction module 502 is supported by an algorithm configured to determine of the direction of movement of the object within the subsequence based on knowing the location of each camera of the plurality of cameras 110 with respect to the entrance openings 232, 234, 250, 252, 254. For example, and with reference back to FIGS. 2 and 3, the location of the first set of cameras 260a, 260b with respect to the first entrance opening 232 is known due to the mounting location of the first set of cameras 260a, 260b on the main body 140 with respect to the first entrance opening 232. Because the location of the first set of cameras 260a, 260b with respect to the first entrance opening 232 is known, the location of the first entrance opening 232 within each cameras' 260a, 260b field of view is also known. If the first captured image of the subsequence detects the object on internal side of a plane defined by the first entrance opening 232 and the last captured of the subsequence detects the object on an external side of the plane defined by the first entrance opening 232, then the direction module 502 can assign a direction for the object as going out of the refrigerator 102. In contrast, if the first captured image of the subsequence detects the object on the external side of the plane defined by the first entrance opening 232 and the last captured of the subsequence detects the object on the internal side of the plane defined by the first entrance opening 232, then the direction module 502 can assign a direction for the object as going into the refrigerator 102.

The inventory update module 504 is configured to communicate with the memory 470 and/or the data store 472 via the bus 124 and/or the remote server 130 via the network 132 to update an inventory status of at least one storage compartment in the plurality of storage compartments 172 based on each inventory change and the direction assigned thereto. The inventory update module 504 can also be configured to send all captured images of a session to the remote server 130 via a data pipeline routed through the network 132. The inventory update module 504 can also be configured to package corresponding subsequence data including object identification information, track identification information, and direction information for each merge identification, and to send the subsequence data to the object storage service with the captured images.

When an object is detected as going out of the refrigerator 102 by the direction module 502, then the item that was located in the refrigerator and was the object associated with that particular item, is removed from the inventory of the refrigerator. This inventory information can be stored in the memory 470, the data store 472 and/or the remote server 130 and can be output to an application accessible by a portable device 510 for viewing the inventory information on a display of the portable device 510.

Methods for Tracking Inventory

Figure 4:
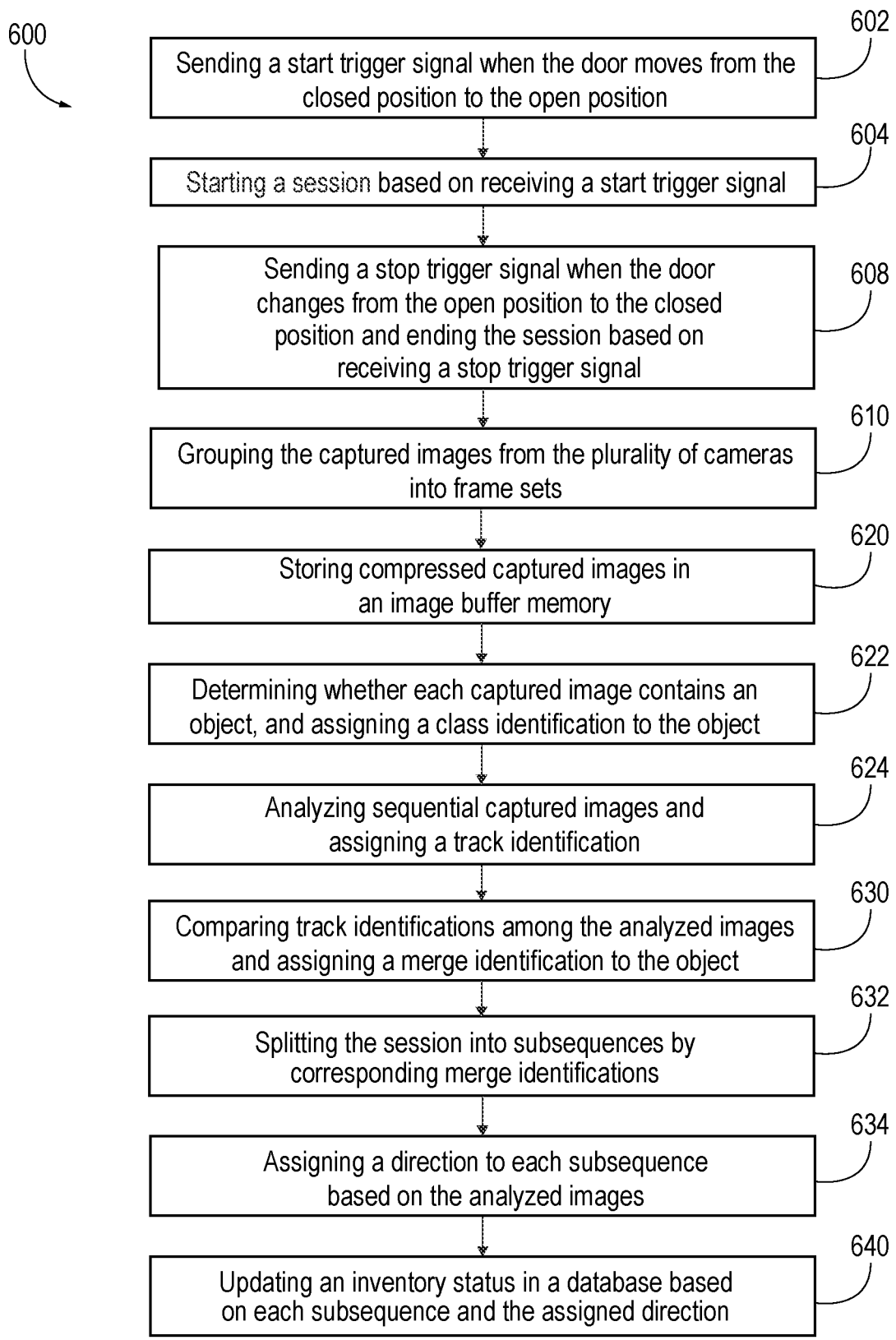
FIG. 4 is a process flow chart for tracking inventory in the refrigerator.

Referring to FIG. 4, a method 600 for tracking inventory in the refrigerator 102 will be described according to an exemplary embodiment. FIG. 4 will be described with reference to FIGS. 1-3. For simplicity, the method 600 will be described as a sequence of blocks, but the elements of the method 600 can be organized into different architectures, elements, stages, and/or processes.

At block 602, the method 600 includes sending a start trigger signal when the door 142 moves from the closed position to the open position. In this regard, the trigger switch 104 sends a start trigger signal to the session controller module 480 when the trigger switch 104 detects a position of the door 142 to be in the open position.

At block 604, the method 600 includes starting a session based on receiving the start trigger signal. In this regard, the session controller module 480 starts a session in response to receiving a start trigger signal from the trigger switch 104.

At block 606, the method 600 includes capturing images using the plurality of cameras 110 mounted to at least one of the main body 140 and the door 142 after the start trigger signal has been received by the session controller module 480. The main body 140 and the door 142 define a refrigerated enclosure when the door 142 is in the closed position, and each camera is positioned to have a field of view through an entrance opening plane of the refrigerated enclosure which is accessible when the door is in the open position. As such, the plurality of cameras 110 is configured to capture images of an object passing through the entrance opening plane during the session, as the object is being loaded into or is being removed from the refrigerated enclosure.

At block 608, the method 600 includes sending a stop trigger signal when the door 142 changes from the open position to the closed position. In this regard, the trigger switch 104 sends a stop trigger signal to the session controller module 480 when the position sensor 454 detects the door 142 has moved from the open position to the closed position. At block 608, the method 600 further includes ending the session started at block 604 based on receiving a stop trigger signal. In this regard, the session controller module 480 ends the session started at block 602 when the session controller module 480 receives the stop trigger signal from the trigger switch 104 and the session controller 480 can update so that the next session is identified with a new session ID. The plurality of cameras 110 cease capturing images after the session controller module 480 receives the stop trigger signal.

At block 610, the method 600 includes grouping the captured images taken from the plurality of cameras 110 at block 606. In this regard, the synchronizer module 482 receives the compressed images from the plurality of cameras 110, and outputs frame sets to the buffer module 484 and to the object identification module 490. In this regard, the synchronizer module 482 groups the captured images into frame sets, where each frame set is made up of captured images that were captured at a same time from different cameras among the plurality of cameras 110. With continued reference to block 610, the method 600 also includes receiving a session identification, a camera identification, and a frame identification for each captured image received from each camera of the plurality of cameras 110. The session identification is associated with the session, the camera identification is associated with a particular camera among the plurality of cameras 110 that captured the image, and the frame identification is associated with a time at which the captured image was captured. In this regard, the synchronizer module 482 groups the captured images based on the session identification, the camera identification, and the frame identification for each captured image.

At block 620, the method 600 includes storing compressed captured images that were captured in block 606 in an image buffer memory. The compressed images can be sent to post processing after the session ends. In this regard, the buffer module 484 stores the images captured by the plurality of cameras 110 during the session started at block 604, and sends the compressed images to the synchronizer module 482 for post processing after the session ends.

At block 622, the method 600 includes determining whether each captured image from block 606 contains an object, and assigning a class identification to the object. With continued reference to block 622, the method 600 also includes using a computer vision model to output a bounding box around the object and the class identification for the object for each captured image. In this regard, the object identification module 490 receives frame sets output from the synchronizer module 482 to determine whether each captured image in a respective frame set contains the object, assigns a class identification to the object, and outputs a bounding box around the object.

At block 624, the method 300 includes analyzing sequential captured images from each camera in the plurality of cameras 172 and assigning a track identification associated with the object in each analyzed image per camera. In this regard, the object tracking module 492 receives the sequential captured images from the object identification module 490 for assigning track identifications, and outputs the track identifications to the object merge module 494. In an embodiment, the object tracking module 492 analyzes sequential captured images and assigns a track identification using an observation-centric simple online and real-time tracking algorithm.

At block 630, the method 600 includes comparing track identifications among the analyzed images from different cameras in the plurality of cameras 172 and assigning a merge identification to the object when the object is detected in captured images captured by multiple different cameras in the plurality of cameras 172. In this regard, the object merge module 494 receives and compares track identifications from the object tracking module 492, and outputs merge identifications to the subsequence delineation module.

At block 632, the method 600 includes splitting the session into subsequences by corresponding merge identifications, where each subsequence corresponds to an inventory change within the refrigerated enclosure. In this regard, the subsequence delineation module 500 receives the merge identifications from the object merge module 494, and outputs subsequences to the direction module 502.

At block 634, the method 600 includes assigning a direction to each subsequence based on the analyzed images to determine if the object is moving into, out of or internally within the refrigerated enclosure. In this regard, the direction module 502 receives subsequences from the subsequence delineation module 500, and outputs assigned directions to the inventory update module 504.

At block 640, the method 600 includes updating an inventory status in a database based on each subsequence and the direction assigned thereto. In this regard, the inventory update module 504 receives subsequences from the subsequence delineation module 502, and receives assigned directions from the direction module 502 to update an inventory status maintained on the database.

Figure 5:
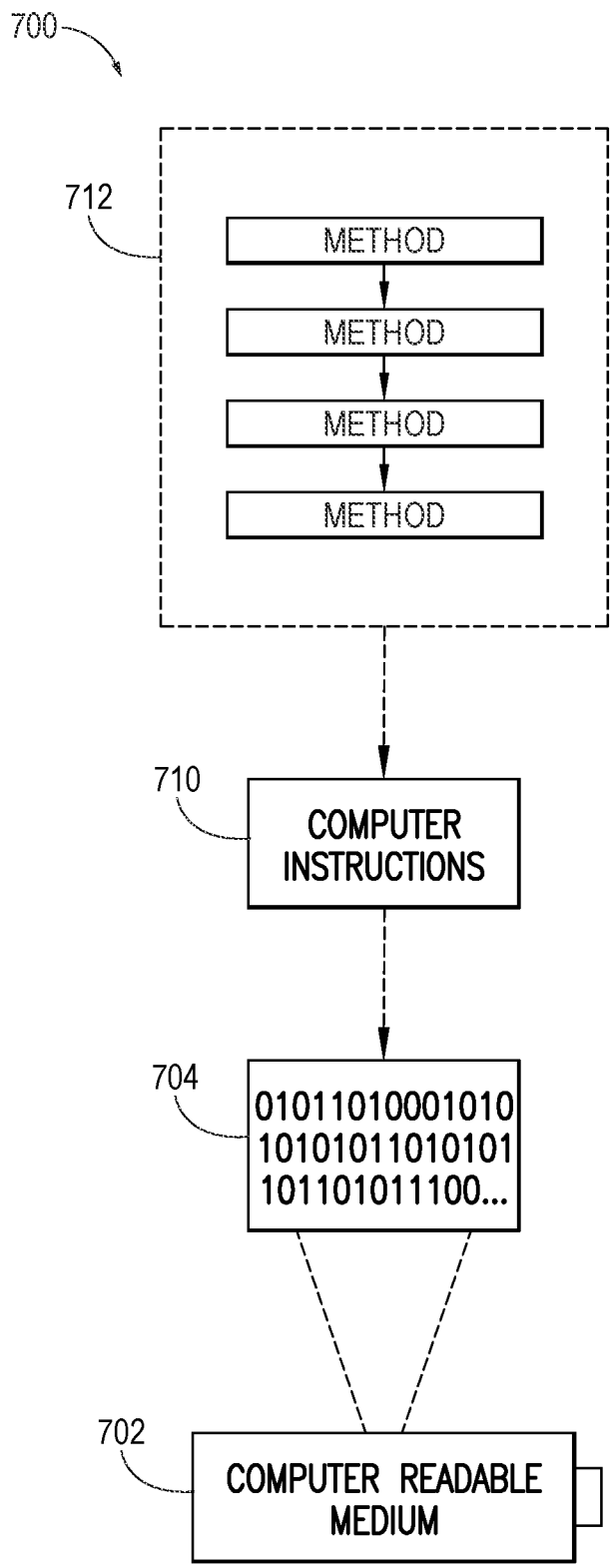
FIG. 5 is an illustration of a computer-readable medium or computer-readable device including processor-executable instructions configured to embody one or more of the provisions set forth herein.

An aspect of the present disclosure involves a computer-readable medium including processor-executable instructions configured to implement at least one aspect of the techniques presented herein. An aspect of a computer-readable medium or a computer-readable device devised in these ways is illustrated in FIG. 5, where an implementation 700 includes a computer-readable medium 702, such as a CD-R, DVD-R, flash drive, a platter of a hard disk drive, etc., on which is encoded computer-readable data 704. This encoded computer-readable data 704, such as binary data including a plurality of zero's and one's as shown in FIG. 5, in turn includes a set of processor-executable computer instructions 710 configured to operate according to one or more of the principles set forth herein. In this implementation 700, the processor-executable computer instructions 710 may be configured to perform a method 712, such as the method 600 of FIG. 4. In another aspect, the processor-executable computer instructions 710 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that variations of the above-disclosed embodiments and other features and functions, or alternatives or varieties thereof, may be desirably combined with many other different systems or applications. Also, various presently unforeseen or unanticipated alternatives, modifications, variations or improvements therein may be subsequently made by those skilled in the art which are also intended to be encompassed by the following claims.

The invention claimed is:

1. A refrigerator comprising:
   a main body and a door pivotally mounted to and movable with respect to the main body between an open position and a closed position, the main body and the door defining a plurality of storage compartments within a refrigerated enclosure when the door is in the closed position;
   a plurality of cameras mounted to at least one of the main body and the door, each camera positioned to have a field of view that includes an entrance opening leading to at least one storage compartment when the door is in the open position, the plurality of cameras being configured to capture images of an object passing through the entrance opening as the object is being loaded into or is being removed from the at least one storage compartment; and
   at least one computing device in operable connection with the plurality of cameras, the at least one computing device including:
      a session controller module configured to start a session and to instruct each camera to begin capturing images based on a trigger signal received by the session controller;
      a synchronizer module configured to receive captured images from the plurality of cameras and to group the captured images into frame sets, each frame set made up of respective captured images that were captured at a same time from different cameras among the plurality of cameras;

an object identification module configured to determine whether each captured image in a respective frame set contains the object and to assign a class identification to the object;

an object tracking module configured to analyze sequential captured images from each camera and to assign track identifications to associate the object in one analyzed image to the object in other analyzed images per camera;

an object merge module configured to compare the track identifications among the analyzed images from different cameras and to assign a merge identification to the object when the object is detected by the object identification module in captured images captured by multiple different cameras among the plurality of cameras;

a subsequence delineation module configured to split the session into subsequences by corresponding merge identifications received from the object merge module, wherein each subsequence corresponds to an inventory change for the at least one storage compartment;

a direction module configured to assign a direction to each subsequence based on the analyzed images to determine if the object is moving into, out of or internally within the refrigerated enclosure; and an inventory update module configured to communicate with a database to update an inventory status of the at least one storage compartment based on each inventory change and the direction assigned thereto.

2. The refrigerator of claim 1, wherein the plurality of cameras mounted to the main body each have a field of view directed away from the refrigerated enclosure.

3. The refrigerator of claim 1, wherein the plurality of cameras each have a field of view encompassing at least a portion of at least one entrance opening leading to at least one storage compartment among the plurality of storage compartments.

4. The refrigerator of claim 1, wherein each storage compartment among the plurality of storage compartments is associated with at least one camera among the plurality of cameras such that the at least one camera has a field of view encompassing at least a portion of a respective entrance opening of a particular storage compartment among the plurality of storage compartments.

5. The refrigerator of claim 4, wherein each storage compartment among the plurality of storage compartments is associated with at least two cameras mounted on opposite sides of each respective storage compartment.

6. The refrigerator of claim 1, wherein the direction module assigns the direction to each subsequence based on a known mounting location of each camera on the main body.

7. The refrigerator of claim 6, further comprising a door angle sensor configured to determine an angle of the door with respect to the main body when the door is in the open position, and the direction module assigns the direction to each subsequence based on the angle of the door with respect to the main body.

8. The refrigerator of claim 1, wherein the object identification module is configured to determine whether each captured image in a respective frame set contains multiple objects and to assign a different class identification to each different object;

wherein the object tracking module is configured to assign different track identifications to the different objects in each analyzed image per camera; and wherein the object merge module is configured to compare the different track identifications among the analyzed images from different cameras and to assign a same merge identification to a same object when the same object is detected by the object identification module in captured images captured by multiple different cameras among the plurality of cameras.

9. The refrigerator of claim 8, wherein the subsequence delineation module configured to split the session into different subsequences by corresponding merge identifications received from the object merge module, wherein each different subsequence corresponds to an inventory change for the at least one storage compartment.

10. A method for tracking inventory in a refrigerator, the method comprising:

starting a session based on receiving a trigger signal;

capturing images using a plurality of cameras mounted to at least one of a main body and a door pivotally mounted to and movable with respect to the main body between an open position and a closed position, wherein the main body and the door define a refrigerated enclosure when the door is in the closed position, each camera is positioned to have a field of view through an entrance opening plane of the refrigerated enclosure which is accessible when the door is in the open position, and the plurality of cameras is configured to capture images of an item passing through the entrance opening plane as the item is being loaded into or is being removed from the refrigerated enclosure;

determining in a computing device in communication with the plurality of cameras whether each captured image contains an object;

analyzing in the computing device sequential captured images from each camera and assigning track identifications to associate the object in one analyzed image to the object in other analyzed images per camera;

comparing in the computing device the track identifications among the analyzed images from different cameras and assigning a merge identification to the object when the object is detected in captured images captured by multiple different cameras among the plurality of cameras;

splitting in the computing device the session into subsequences by corresponding merge identifications, wherein each subsequence corresponds to an inventory change within the refrigerated enclosure;

assigning in the computing device a direction to each subsequence based on the analyzed images to determine if the object is moving into, out of or internally within the refrigerated enclosure; and updating an inventory status in a database based on each subsequence and the direction assigned thereto.

11. The method of claim 10, further comprising sending a start trigger signal when the door moves from the closed position to the open position, and sending a stop trigger signal when the door moves from the open position to the closed position, wherein the plurality of cameras begin capturing images after receiving the start trigger signal and the plurality of cameras cease capturing images after receiving the stop trigger signal.

12. The method of claim 10, further comprising receiving a session identification, a camera identification, and a frame identification for each captured image received from each camera of the plurality of cameras, wherein the session identification is associated with the session, the camera identification is associated with a particular camera among the plurality of cameras, and the frame identification is associated with a time at which the captured image was captured.

13. The method of claim 10, further comprising grouping the captured images from the plurality of cameras into frame sets, wherein each frame set is made up of captured images that were captured at a same time from different cameras among the plurality of cameras.

14. The method of claim 10, further comprising assigning a class identification to the object, and using a computer vision model to output a bounding box around the object and the class identification for the object for each captured image.

15. The method of claim 10, wherein analyzing sequential captured images and assigning a track identification is performed using an observation-centric simple online and real-time tracking algorithm.

16. The method of claim 10, further comprising determining an angle of the door with respect to the main body when the door is in the open position, and assigning the direction to each subsequence further includes assigning the direction to each subsequence based on the angle of the door with respect to the main body.

17. The method of claim 10, wherein updating the inventory status includes determining an inventory change based on corresponding item classification information, merge identification information, and direction information, then recording the inventory change in the database.

18. The method of claim 10, wherein determining in the computing device in communication with the plurality of cameras whether each captured image contains an object includes determining whether each captured image contains multiple objects; and wherein analyzing in the computing device sequential captured images from each camera and assigning track identifications to associate the object in one analyzed image to the object in other analyzed images per camera includes assigning different track identifications to different objects.

19. The method of claim 18, wherein comparing in the computing device the track identifications among the analyzed images from different cameras and assigning a merge identification to the object when the object is detected in captured images captured by multiple different cameras among the plurality of cameras includes assigning a different merge identification to different objects; and wherein splitting in the computing device the session into subsequences by corresponding merge identifications, includes splitting the session into different subsequences by corresponding merge identifications.

20. A non-transitory computer readable storage medium storing instructions that, when executed by a computer having a processor, cause the processor to perform a method comprising:

starting a session based on receiving a trigger signal;

capturing images using a plurality of cameras mounted to at least one of a main body and a door pivotally mounted to and movable with respect to the main body between an open position and a closed position, wherein the main body and the door define a refrigerated enclosure when the door is in the closed position, each camera is positioned to have a field of view through an entrance opening plane of the refrigerated enclosure which is accessible when the door is in the open position, and the plurality of cameras is configured to capture images of an item passing through the entrance opening plane as the item is being loaded into or is being removed from the refrigerated enclosure;

determining in a computing device in communication with the plurality of cameras whether each captured image contains an object;

analyzing in the computing device sequential captured images from each camera and assigning track identifications to associate the object in one analyzed image to the object in other analyzed images per camera;

comparing in the computing device the track identifications among the analyzed images from different cameras and assigning a merge identification to the object when the object is detected in captured images captured by multiple different cameras among the plurality of cameras;

splitting in the computing device the session into subsequences by corresponding merge identifications, wherein each subsequence corresponds to an inventory change within the refrigerated enclosure;

assigning in the computing device a direction to each subsequence based on the analyzed images to determine if the object is moving into, out of or internally within the refrigerated enclosure; and updating an inventory status in a database based on each subsequence and the direction assigned thereto.

* * * * *